US011217061B2

(12) United States Patent
Urban et al.

(10) Patent No.: US 11,217,061 B2
(45) Date of Patent: Jan. 4, 2022

(54) ELECTRONIC GAMING MACHINE INCLUDING AN ILLUMINABLE NOTIFICATION MECHANISM

(71) Applicant: Aristocrat Technologies Australia Pty Limited, North Ryde (AU)

(72) Inventors: Bruce Edward Urban, Las Vegas, NV (US); Gregory Paul Schwartz, Las Vegas, NV (US); John Fredrick Dawson, III, Spring Hill, TN (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 231 days.

(21) Appl. No.: 16/116,350

(22) Filed: Aug. 29, 2018

(65) Prior Publication Data

US 2020/0074793 A1 Mar. 5, 2020

(51) Int. Cl.
*A63F 9/24* (2006.01)
*A63F 13/00* (2014.01)
*G06F 17/00* (2019.01)
*G07F 17/32* (2006.01)

(52) U.S. Cl.
CPC ...... *G07F 17/3216* (2013.01); *G07F 17/3209* (2013.01); *G07F 17/3223* (2013.01); *G07F 17/3239* (2013.01); *G07F 17/3293* (2013.01)

(58) Field of Classification Search
CPC .................................................. G07F 17/3202
See application file for complete search history.

(56) References Cited

U.S. PATENT DOCUMENTS

2003/0069073 A1* 4/2003 Okada ................. G07F 17/3232 463/42
2005/0239546 A1* 10/2005 Hedrick .............. G07F 17/3239 463/29
2006/0073888 A1 4/2006 Nguyen et al.
2006/0172805 A1* 8/2006 Okada ...................... G07F 17/32 463/46
2006/0247041 A1* 11/2006 Walker ................ G07F 17/3269 463/29
2006/0258422 A1* 11/2006 Walker .................... G07F 17/32 463/7

(Continued)

*Primary Examiner* — Milap Shah
*Assistant Examiner* — Jason Pinheiro
(74) *Attorney, Agent, or Firm* — Armstrong Teasdale LLP

(57) ABSTRACT

An electronic gaming machine may include an illuminable notification mechanism, which may be disposed on a rear surface of the electronic gaming machine in a position or location that makes the notification mechanism visible to a casino operator. The notification mechanism may include a display, such as, for example, a display that includes at least one tri-color light emitting diode (LED). The display of the notification mechanism may be selectively illuminated in a variety of lighting configurations based, for example, upon gameplay activity of a player of the gaming machine. For instance, in some embodiments, the notification mechanism may be selectively illuminated in any of an inactive lighting configuration, an active lighting configuration, or a privileged lighting configuration. In the privileged lighting configuration, the notification mechanism may indicate that a player of the gaming machine is entitled to a complimentary item (e.g., a free or reduced-price item or service).

17 Claims, 5 Drawing Sheets

(56) References Cited

U.S. PATENT DOCUMENTS

| | | | | |
|---|---|---|---|---|
| 2007/0123354 | A1* | 5/2007 | Okada | G07F 17/3251 463/47 |
| 2014/0059478 | A1* | 2/2014 | Dearman | G06F 3/04886 715/781 |
| 2015/0221167 | A9 | 8/2015 | Colvin et al. | |
| 2016/0335846 | A1* | 11/2016 | Guinn | G07F 17/3237 |

* cited by examiner

ELECTRONIC GAMING MACHINE INCLUDING AN ILLUMINABLE NOTIFICATION MECHANISM

TECHNICAL FIELD

The field of disclosure relates generally to electronic gaming, and more particularly to an electronic gaming machine that includes an illuminable notification mechanism.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards form any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to include differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

SUMMARY

In one aspect, an electronic gaming machine may include a cabinet and an illuminable notification mechanism, which may be mounted on the cabinet in a position or location that makes the notification mechanism viewable by a casino operator proximate the cabinet. The electronic gaming machine may also include a game controller, which may be configured to perform a variety of operations. For example, in at least some embodiments, the game controller may be configured to select (e.g., based upon an analysis of gameplay data) a lighting configuration of the notification mechanism from a plurality of lighting configurations. In at least one embodiment, the selected lighting configuration may indicate, for example, that a player of the electronic gaming machine is entitled to a complimentary item (e.g., a free or reduced-price item or service). Likewise, in at least some embodiments, the game controller may be configured to illuminate the notification mechanism in the selected lighting configuration, and receive an input from the casino operator via the notification mechanism. For example, the notification mechanism may include a mechanical pushbutton, which the casino operator may activate or depress to provide the input. Further, in at least some embodiments, the game controller may be configured to select, in response to the input provided by the casino operator, a different lighting configuration of the notification mechanism. The different lighting configuration may, for example, indicate, at least, that the player has received the complimentary item.

BRIEF DESCRIPTION OF THE DRAWINGS

An example embodiment of the subject matter disclosed will now be described with reference to the accompanying drawings.

DETAILED DESCRIPTION

An electronic gaming machine configured to illuminate a notification button is generally described. In at least one embodiment, the notification button is disposed on a rear surface of the gaming machine and includes a display that is capable of illumination in a plurality of lighting configurations, depending, for example, upon a player's gameplay activity on the gaming machine. For example, in at least one embodiment, the notification button may be illuminated in any of an inactive lighting configuration, an active lighting configuration, or a privileged lighting configuration. The inactive lighting configuration may be used to indicate that a player is seated at the gaming machine but that the player has not satisfied at least one gameplay criterion, such as, for example, that the player has not established a minimum credit balance. Likewise, the active lighting configuration may be used to indicate that the player has established a minimum credit balance, but that the player has not satisfied at least one other gameplay criterion, such as, for example, that the player has not placed a minimum wager. Finally, a privileged lighting configuration may be used to indicate that the player is entitled to a comp (e.g., a comped item or service). In at least one embodiment, the privileged lighting configuration may be displayed when a player has established a minimum credit balance and placed a minimum wager.

Figure 1:
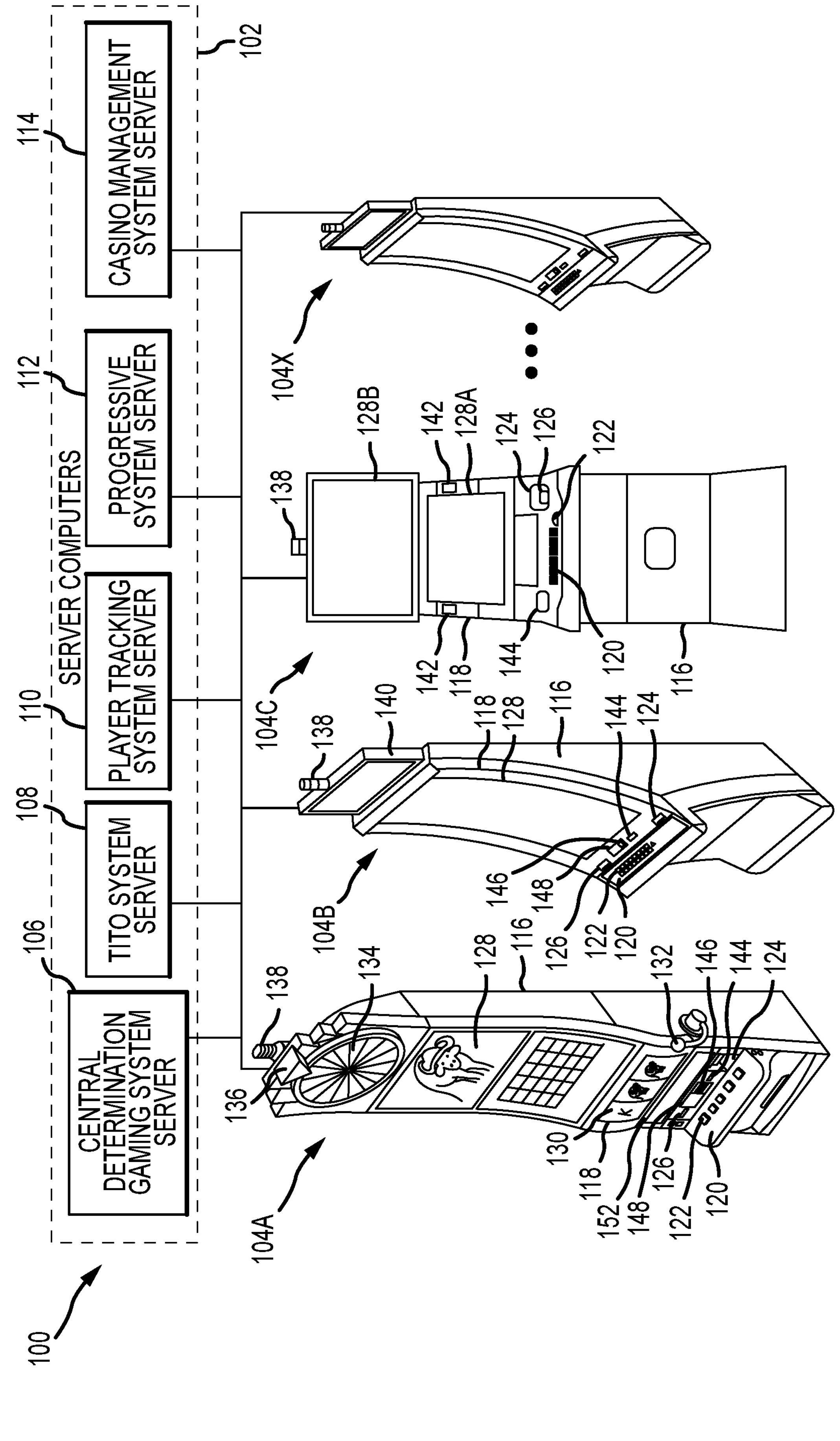
FIG. 1 is an exemplary diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, the total amount of money deposited, the total amount of money withdrawn, and the total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
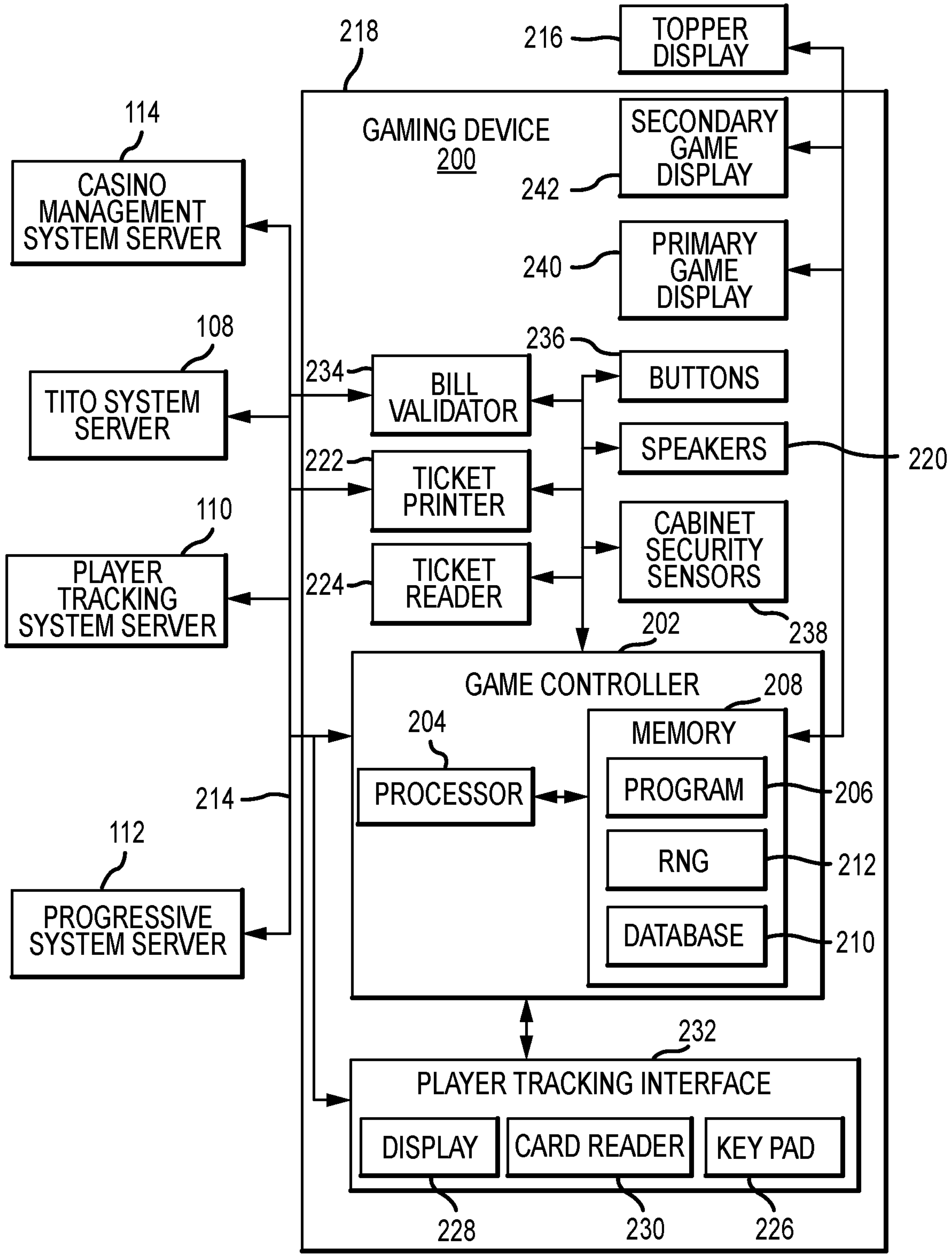
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software and provide new technology in that they facilitate, for example, and in at least one embodiment, a notification system for alerting a casino operator to one or more player entitlements, such as one or more player comps. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although not shown at FIG. 1, in at least some embodiments, an EGM 104A-104X of gaming system 100 may be installed in a gameplay surface, such as, for example, in a surface of a bar and/or within any other suitable gameplay surface. As used herein, an EGM installed in such a gameplay surface may be referred to as a "bartop" EGM (or simply an "EGM" for brevity). Although the present disclosure is primarily described below with reference to a bartop EGM, it will be appreciated that many of the advantages and features of the present disclosure may be equally applicable to a variety of other electronic gaming systems and EGMs, such as, for example, any of EGMs 104A-104X.

Figure 3:
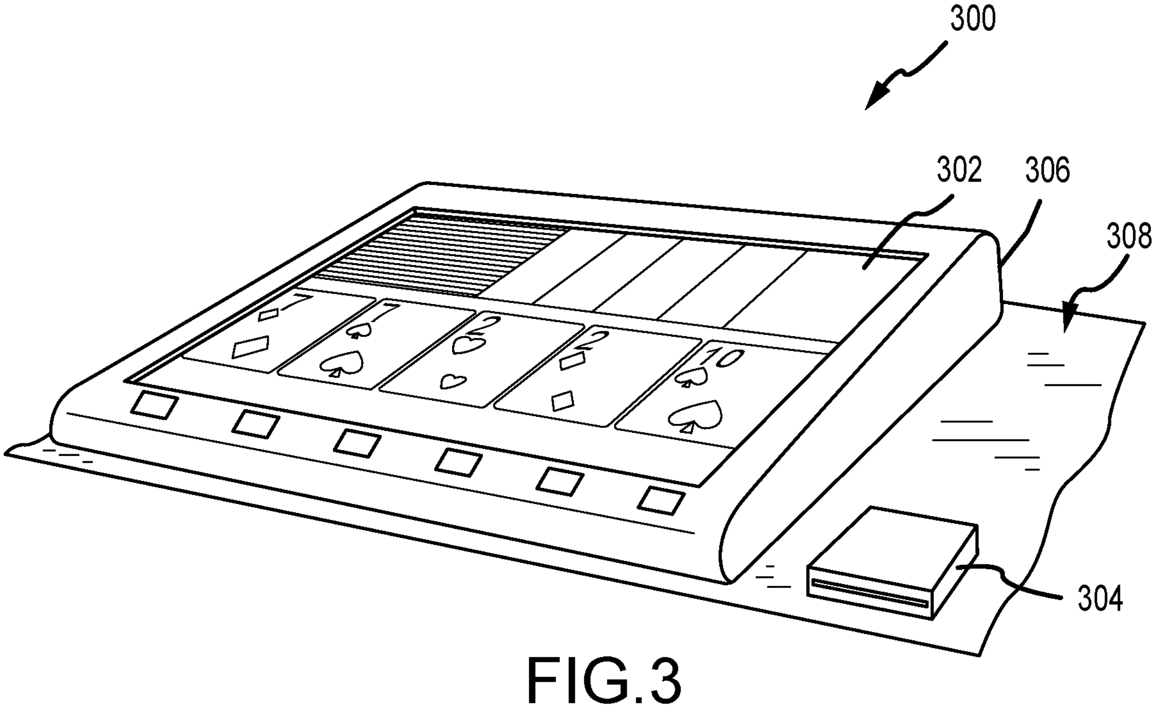
FIG. 3 is a front perspective view on an exemplary EGM that includes an illuminable notification mechanism.

A front perspective view of an exemplary bartop EGM 300 is shown with reference to FIG. 3. As shown, bartop EGM 300 includes all of the components described above with reference to EGMs 104A-104X. For example, bartop EGM 300 includes a display 302, a credit input mechanism 304, a game controller (not shown), and/or any other EGM component, as described herein. Further, many of the components of bartop EGM 300 are contained within and/or supported by a cabinet 306, which may be at least partially located beneath a gaming surface 308 (e.g. a bartop). For example, display 302 is at least partially contained within and supported by cabinet 306.

Likewise, a game controller, such as game controller 202, may be contained and/or supported within cabinet 306. In various embodiments, game controller 202 may perform one or more operations described herein with respect to illumination and control of notification mechanism 402. To this end, and in some embodiments, game controller 202 is a central processing unit (CPU) of EGM 300, such as a main or primary CPU. However, in other embodiments, game controller 202 may include any other processor of EGM 300, such as, for example, any dedicated and/or secondary processor included in EGM 300. Further, in at least some embodiments, and as described herein, game controller 202 may include a plurality of processors, such as, for example, a dual-core arrangement of processors, a quad-core arrangement of processors, and eight-core arrangement of processors, and/or any other arrangement of processors.

Bartop EGM 300 may be mounted within the gaming surface 308, such that display 302 faces away from an interior of a bar towards a player, and such that a rear surface of EGM 300 and/or cabinet 306 faces into the interior of the bar. As used herein, an "interior" of a bar may refer to any area of a bar within or around which a bartender and/or another casino operator may work and/or otherwise physically reside. Likewise, as used herein, an "exterior" of a bar may refer to any area within or around which a player may physically reside.

Thus, EGM 300 may be arranged, such that display 302, credit input mechanism 304, and any other player input interface component are oriented toward an exterior of a bar for access by a player. Likewise, EGM 300 may be arranged such that, at least, a rear surface of cabinet 306 (which may include a notification mechanism, such as a notification button, as described in greater detail below) faces or is oriented toward an interior of the bar.

Figure 4:
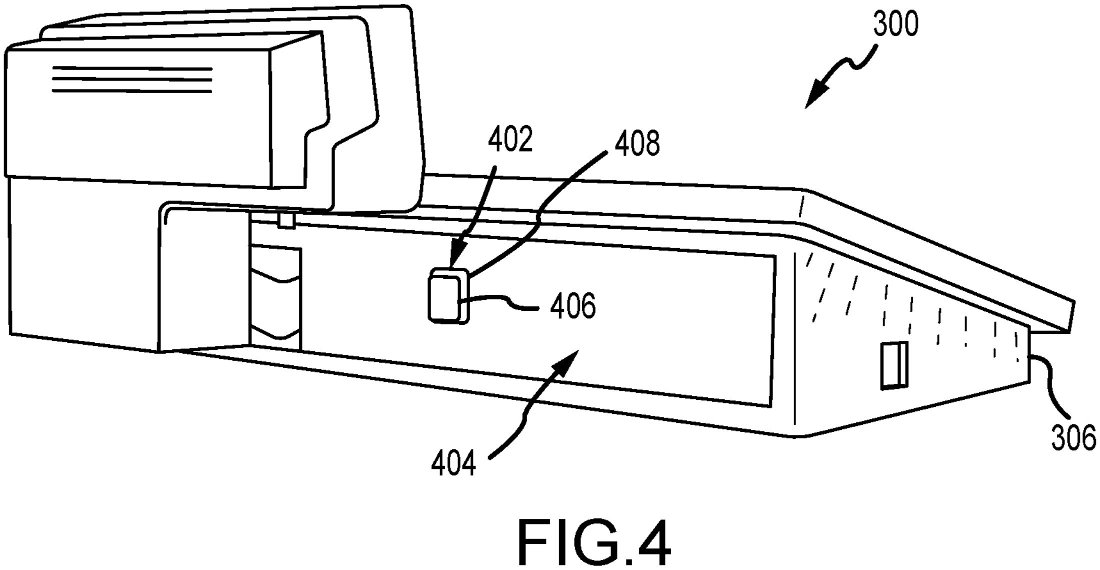
FIG. 4 is a rear perspective view of the EGM shown at FIG. 3.

FIG. 4 is a rear perspective view of EGM 300 (shown in FIG. 3). As shown, EGM 300 includes an illuminable notification mechanism 402. In the exemplary embodiment, notification mechanism 402 may include any of a variety of illuminable and/or selectable hardware, such as, for example, any suitable mechanical pushbutton having an integrated illuminable display. In at least one embodiment, notification mechanism 402 extends at least partially away from a rear surface 404 of cabinet 306 of EGM 300. Specifically, in at least some embodiments, notification mechanism 402 is mounted on rear surface 404 of cabinet 306 and extends through rear surface 404 into an interior of cabinet 306, where, for example, notification mechanism 402 may be electrically and/or communicably coupled to game controller 202. Game controller 202 may thus be operable to provide a variety of control instructions to notification mechanism 402, such as, for example, control instructions to control a lighting configuration of notification mechanism 402.

Accordingly, notification mechanism 402 may include any suitable mechanical pushbutton and/or any other mechanism capable of activation by a casino operator. For instance, in one embodiment, notification mechanism 402 may include an infrared sensor and/or a motion sensor, either of which may be capable of detecting the presence of a casino operator. For example, a motion detector and/or infrared sensor may detect the presence of a casino operator's hand when the casino operator places or waves his had near the motion detector and/or infrared sensor. Although a mechanical pushbutton, a motion detector, and an infrared sensor are described herein, it will be appreciated that any other suitable hardware element may be used to receive an input (e.g., an input indicating that a player has received a comp) from a casino operator.

As described briefly above, notification mechanism 402 may, in addition, include a display 406, which may, in turn, include one or more display elements. For instance, display 406 of notification mechanism 402 may include one or more light emitting diodes (LEDs), such as one or more tri-color LEDs. Similarly, in at least some embodiments, display 406 may include any liquid crystal display (LCD), any light emitting diode (LED) display, any organic light emitting diode (OLED) display, and/or any other suitable display. Moreover, in at least some embodiments, display 406 may be capable of displaying graphic images (e.g. ICON, Emoji, etc.) and text messages, such as, for example, one or more text messages. As described herein, text messages and/or graphic images may be displayed in addition to one or more lighting configurations and/or in substitution of one or more lighting configurations.

Notification mechanism 402 may, in addition, and in at least some embodiments, include an illuminable bezel 408. In at least one embodiment, bezel 408 may surround display 406 and extend about a perimeter of notification mechanism 402. However, in another embodiment, display 406 may simply be capable of illuminate in a lighting configuration (e.g., an active lighting configuration) in a manner that suggests that presence of bezel 408. For example, in at least one embodiment, display 406 may be illuminated in a lighting configuration, such as an active lighting configuration, around a perimeter of display 406 to create an illuminated perimeter or "halo" around display 406. However, where bezel 408 is incorporated as a separate hardware element, bezel 408 may, like display 406, include any LED display, any OLED display, any LCD display, and/or any other suitable illuminable hardware component and/or display element.

In the exemplary embodiment, display 406 of notification mechanism 402 extends away from rear surface 404 of cabinet 306 and is oriented to face toward or into an interior of a bar. Specifically, display 406 of notification mechanism 402 may be positioned or mounted on cabinet 306, such that display 406 is generally visible by and/or within a line of sight of a casino operator, such as a bartender. Likewise, notification mechanism 402 may be positioned on rear surface 404 of cabinet 306, such that the casino operator may physically reach and activate (e.g., depress) notification mechanism 402.

Now, as described in detail below, EGM 300 may be capable of displaying a variety of notifications. More particularly, in the exemplary embodiment, EGM 300 may display one or more notifications, such as via display 406 of notification mechanism 402, relating to a comp status of EGM 300. As used herein, these notifications may be referred to as "comp notifications," to indicate a relationship to or association with a player's level of comp or comp status.

As used herein, the terms "comp" and "complimentary item" may refer to any free, price-reduced, and/or otherwise promotional item, service, benefit, and/or reward which may be rendered or provided to a player based upon a player's gameplay activity on EGM 300. For example, as a player plays a wagering game on EGM 300 (e.g., a reel-based wagering game, a card-based wagering game, a keno game, a bingo game, and/or any other suitable wagering game), a variety of gameplay data may be generated relating to the player's gameplay activity. Depending the gameplay data associated with the player's gameplay activity (such as, for example, a credit balance or coin-in established by the player, a wager or bet placed by the player, a rate of play of the player, and the like), one or more "comps" or "complimentary items" may be allocated and/or awarded to the player.

For instance, a player whose gameplay data satisfies one or more criteria may be entitled to one or more free drinks (or "drink comps"). Likewise, players may be entitled, based upon a variety of gameplay data, to food or meal comps (or "meal comps"), free or price-reduced tickets, such as tickets to shows playing within a casino (or "ticket comps"), free or price-reduced items or services (or "item" or "service comps"), such as gift-shop items, spa services offered by a casino, and/or any other "comped" item or service that a casino may provide. Thus, a "comp" may refer to any free item or service, any price-reduced item or service, and/or any other promotional benefit or reward which may be provided to a player, such as, for example, based upon a player's gameplay activity.

A player's gameplay data may be variously collected and/or received by EGM 300. For example, in at least some embodiments, game controller 202 may receive gameplay data directly from one or more components of EGM 300, such as, for example, from player tracking interface 323, bill validator 234, ticket reader 224, primary game display 240, secondary game display 242, buttons 236, cabinet security sensors 238, and/or any other hardware and/or software component of EGM 300 capable of collecting and/or generating gameplay data.

Similarly, in at least some embodiments, game controller 202 may receive gameplay data from any server system to which EGM 300 may be communicatively coupled, such as, for example, from any of central determination gaming system server 106, TITO system server 108, player tracking system server 110, progressive system server 112, and/or casino management system server 114. In at least one embodiment, game controller 202 may be configured to receive and process gameplay data in any suitable format and/or as part of any suitable communications protocol. For example, in some embodiments, game controller 202 may receive and process gameplay data in a game-to-system (G2S) protocol, as developed and maintained by the Gaming Standards Association (GSA).

To display a comp notification, game controller 202 of EGM 300 may control display 406 and/or bezel 408 of notification mechanism 402 to display a variety of lighting configurations. For example, as described in detail below, notification mechanism 402 may be controlled to display a lighting configuration indicating that a player is active on EGM 300 but not currently entitled to a comp. Similarly, notification mechanism 402 may display a lighting configuration indicating that a player is active on EGM 300 and has earned a privilege, such as a comp, based upon the player's gameplay activity on EGM 300. Further, in at least some embodiments, notification mechanism 402 may display a lighting configuration, such as in response to physical activation by a casino operator, indicating that the operator has provided a player an earned comp or privilege.

As described in detail herein, these lighting configurations may be visible to a casino operator, such as a bartender, but may not be (e.g., easily) visible to a player of EGM 300 while the player is actively playing EGM 300. Specifically, as described above, notification mechanism 402 may be disposed on a location of EGM 300 (e.g., such as rear surface 404 of cabinet 306) that permits a casino operator to observe a lighting configuration of notification mechanism 402, but that is also difficult to observe by a player, at least, while the player is seated at EGM 300 and playing EGM 300. In the case that notification button is disposed on rear surface 404 of cabinet 306, for example, a player may have to peer over EGM 300 (e.g., essentially craning or peering into the interior of a bar) to observe a lighting configuration of notification mechanism 402.

Figure 5:
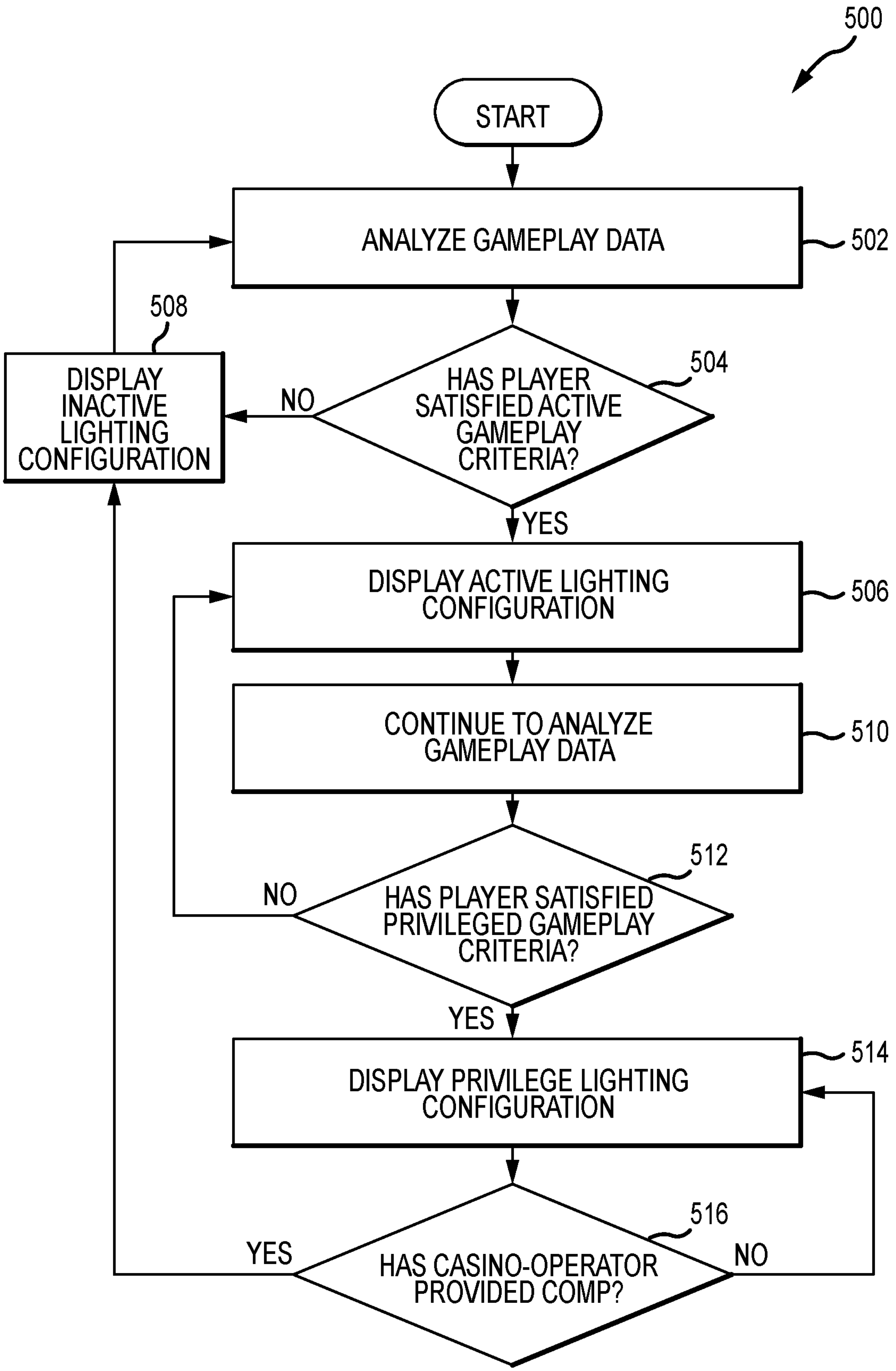
FIG. 5 is a flowchart illustrating an exemplary process for selectively illuminating a notification mechanism of an EGM, such as the EGM shown at FIG. 3.

FIG. 5 is a flowchart illustrating an exemplary process 500 for selectively illuminating notification mechanism 402 of EGM 300. Specifically, as described above, notification mechanism 402 may be selectively illuminated to display a variety of notifications. In the exemplary embodiment, each notification may be associated with a particular lighting configuration of notification mechanism 402, which a casino operator may visually interpret to ascertain a comp status or comp entitlement of a player of EGM 300.

Accordingly, in at least one embodiment, at least three lighting configurations may be provided. Specifically, an inactive lighting configuration, an active lighting configuration, and a privileged lighting configuration may be provided. Each of these lighting configurations may correspond to a notification, such as an inactive notification, an active notification, and a privileged notification, respectively. In addition, each lighting configuration may correspond to one or more gameplay criteria, which may be satisfied, as described herein, based upon a player's gameplay data.

In the exemplary embodiment, an inactive lighting configuration may be used to indicate that a player seated at EGM 300 is "inactive" on EGM 300, in that, for example, the player is seated at EGM 300 but has not satisfied at least one gameplay criterion necessary to an "active" or "privileged" status. Likewise, an "active" lighting configuration may be used to indicate that a player of EGM 300 is "active," in, at least, that the player has satisfied at least one gameplay criterion necessary to such a status, but that the player has not yet achieved a "privileged" status. Further, a "privileged" lighting configuration may be used to indicate that a player of EGM 300 has satisfied one or more gameplay criteria necessary to such a status (and, for example, that the player is "privileged," in that the player is entitled to one or more comps).

Accordingly, game controller 202 may analyze gameplay data (e.g., in real-time or pseudo real-time) (step 502). Based upon the analysis, game controller 202 may determine whether the player has satisfied one or more active gameplay criteria (step 504). In the exemplary embodiment, an active gameplay criterion may be that the player has established (or maintained and/or re-established) a minimum credit balance. As described herein, a player may establish a credit balance by providing currency (e.g., in the form of physical currency and/or a printed ticket) to a credit input mechanism, such as, for example, bill validator 234 and/or ticket reader 224. Although a single active gameplay criterion may be sufficient in the exemplary embodiment, it will be appreciated that any of a variety of gameplay criteria may be required, as described below, by a casino operator for establishing an active notification and/or an active lighting configuration. Further, as described herein, a casino operator may set (and reset, as the operator desires) a minimum credit balance for a particular EGM 300.

Figure 6:
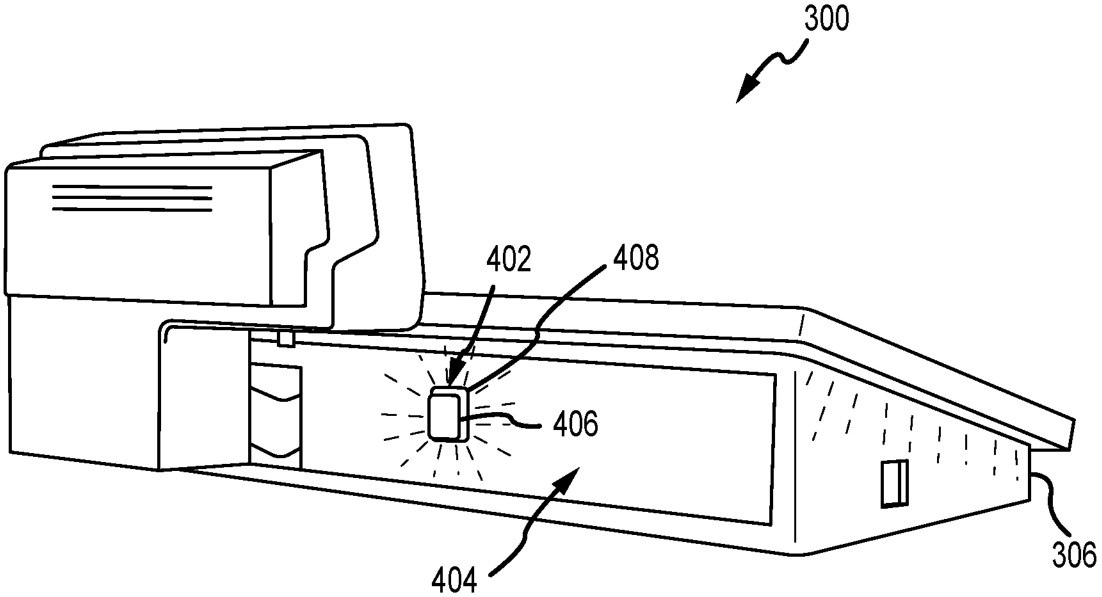
FIG. 6 is a rear perspective view of the EGM shown at FIG. 3, in which the notification mechanism is illuminated in one of a plurality of lighting configurations.

If the player has satisfied the active gameplay criterion (and/or criteria, as the case may be), game controller 202 may display an active lighting configuration on display 406 and/or bezel 408 of notification mechanism 402 (step 506). Although a variety of active lighting configurations are contemplated and within the scope of the present disclosure, in at least one embodiment, an active lighting configuration may include a lighting configuration in which a perimeter of display 406 is illuminated and in which a center portion of display 406 is unilluminated (e.g., a "halo"). Similarly, in an active lighting configuration, bezel 408 may be illuminated while display 406 is not illuminated to create a same or similar "halo" about the perimeter of notification mechanism 402. An embodiment in which notification mechanism 402 is configured in an active lighting configuration is shown with respect to FIG. 6.

If, on the other hand, the player has not satisfied the active gameplay criterion (or criteria), game controller 202 may display an inactive lighting configuration on display 406 and/or bezel 408 of notification mechanism 402 (step 508). Although a variety of inactive lighting configurations are contemplated and within the scope of the present disclosure, in at least one embodiment, an inactive lighting configuration may include a lighting configuration in which display 406 and/or bezel 408 are unilluminated (e.g., in an inactive lighting configuration, notification mechanism 402 may be totally dark or unilluminated). An embodiment in which notification mechanism 402 is configured in an inactive lighting configuration is shown with respect to FIG. 4. Specifically, at FIG. 4, display 406 is unilluminated to notify a casino operator that a player is inactive.

In another embodiment, display 406 and/or bezel 408 may be illuminated in red and/or another suitable color (e.g., using a tri-color LED of display 406) to indicate that the player is inactive. In response to an inactive lighting configuration, a casino operator may, in at least some cases, such as, for example, when a casino is busy and EGMs are in demand, request that a player depart EGM 300 and/or begin play of EGM 300 (e.g., that a player "play or leave"). Thus, one technical effect of an inactive lighting configuration may be that a casino operator is provided a readily apparent means of determining whether a player is simply sitting at an EGM without playing a wagering game provided by the EGM and/or whether the player may, at least, be engaged in or preparing to engage in gameplay.

In the exemplary embodiment, game controller 202 may continue to monitor gameplay data (step 510) to determine whether a player has satisfied one or more privileged gameplay criteria (step 512). In the exemplary embodiment, privileged gameplay criteria may be that the player has established (or maintained and/or re-established) a minimum credit balance and that the player has placed at least one minimum wager. As described herein, these criteria may be set and reset by a casino operator as desired, and a variety of other criteria may also be established by the operator depending, in general, upon the criteria that the operator prefers. In one example, a casino operator may specify privileged gameplay criteria including a minimum credit balance of $20.00 and a minimum wager of 1 credit. However, any suitable criteria may be set by an operator and applied to EGM 300, as described below.

Figure 7:
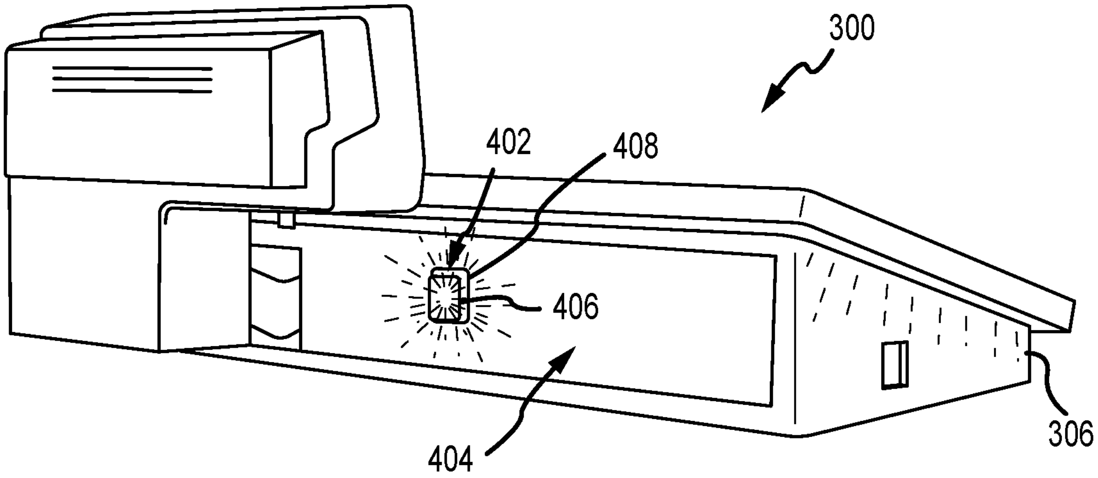
FIG. 7 is a rear perspective view of the EGM shown at FIG. 3, in which the notification mechanism is illuminated in another of a plurality of lighting configurations.

If the player has satisfied the privileged gameplay criteria, game controller 202 may display a privileged lighting configuration on display 406 and/or bezel 408 of notification mechanism 402 (step 514). Although a variety of privileged lighting configurations are contemplated by and within the scope of the present disclosure, in at least one embodiment, a privileged lighting configuration may include a lighting configuration in which display 406 and/or bezel 408 are fully illuminated in a selected color, such as green. An embodiment in which notification mechanism 402 is configured in a privileged lighting configuration is shown with respect to FIG. 7. It will be appreciated, however, that a casino operator may establish any suitable privileged lighting configuration, and that a green-illuminated display 406 and/or bezel 408 are only one example of a privileged lighting configuration. Further, if, on the other hand, the player has not satisfied the privileged gameplay criteria, game controller 202 may display an inactive and/or active lighting configuration, based, for example, upon an ongoing analysis of gameplay data (step 506).

As described herein, illumination of notification mechanism 402 in a privileged lighting configuration may serve to alert a casino operator, such as a bartender, to the fact that a player of EGM 300 is entitled to a comp. In response to illumination of notification mechanism 402 in a privileged lighting configuration, the casino operator may provide the player the comp to which the player is entitled (e.g., a bartender may bring the player a drink comp) (step 516). Likewise, once the player is provided the comp by the casino operator, the casino operator may physically activate notification mechanism 402, such as, for example, by physically depressing notification mechanism 402 (e.g., where notification mechanism 402 is a pushbutton). In another embodiment, notification mechanism 402 may include a touchscreen, in which case, a casino operator may simply touch notification button to activate notification mechanism 402.

In either case, when notification mechanism 402 is activated (and the player is provided a comp), game controller 202 may, in response, illuminate display 406 and/or bezel 408 of notification mechanism 402 in another lighting configuration. For example, in at least one embodiment, game controller may display the inactive lighting configuration (step 508). However, in other embodiments, another suitable lighting configuration, such as the active lighting configuration, may be displayed on notification mechanism 402.

The lighting configuration selected following a change from a privileged lighting configuration may depend, for example, upon the gameplay criteria that are satisfied once a player is provided a comp and/or one or more other criteria. For instance, a player who has received a comp may continue to satisfy the criteria necessary for a privileged status/lighting configuration. However, because the player has recently received a comp, a time criterion may be added to the criteria necessary for illuminating notification mechanism 402, which may prevent illumination of notification mechanism 402 in the privileged lighting configuration for a threshold period of time, such as, for example, a threshold period of time in the range of ten to thirty minutes. In at least one embodiment, after the threshold period of time has expired, game controller 202 may once more permit illumination of notification mechanism 402 in the privileged lighting configuration, such as, for example, to indicate that the player is entitled to another comp.

In addition to the gameplay criteria described above, a variety of other gameplay criteria may be specified, such as, for example, in conjunction with one or more lighting configurations. As described herein, a casino operator may specify one or more of the following criteria in association with any of the lighting configurations described herein and/or in association with any other lighting configuration that notification mechanism 402 may be capable of displaying. To specify these gameplay criteria, a casino operator may be provided a graphical user interface (GUI) by EGM 300, which the casino operator may use to associate any of the following gameplay criteria with any of the lighting configurations described herein and/or any other lighting configuration, such as, for example, any other predefined lighting configuration and/or any other customized lighting configuration that the casino operator may define using the GUI.

Accordingly, in the exemplary embodiment, the following gameplay criteria may be selectable by a casino operator for association with any predefined and/or operator-defined lighting configuration.

| Gameplay Criterion | Brief Summary of the Gameplay Criterion |
|---|---|
| Coin-in | The total amount of money bet by a player during a period of time |
| Coin-in for Extra Comp | The total amount of money bet by a player for an extra comp |
| Player Credit | A player credit on the EGM in excess of a minimum bet |
| Coin-in Rate | Speed of play, such as bets per hour or bets per minute |
| Bet Level | The minimum currency value of a player's bet |
| Denom. | A minimum currency denomination in play (e.g., $1, $5, $10, etc.) |
| Reset | Notification button activated and/or player cashes out of game |
| Response Time | Time taken by casino employee to provide a comp to a player |
| Credit balance | A player's credit balance |
| Wager amount | A player's wager or bet, such as a bet per hand or bet per spin |
| Comp Rate | A period of time required between comps |
| Assistance Request | Assistance requested by a player from a casino operator |
| Schedule | Any gameplay criterion may be scheduled to occur (e.g., daily, etc.) |
| Win Celebration | A win may result in a lighting configuration |
| Max Comps | A maximum number of comps allowed during a period of time |

An electronic gaming machine configured to illuminate an illuminable notification mechanism, such as an illuminable notification button, is thus described. In at least one embodiment, the notification mechanism is disposed on a rear surface of the gaming machine and includes a display that is capable of illumination in a plurality of lighting configurations, depending, for example, upon a player's gameplay activity on the gaming machine. For example, in at least one embodiment, the notification mechanism may be illuminated in any of an inactive lighting configuration, an active lighting configuration, or a privileged lighting configuration. The inactive lighting configuration may be used to indicate that a player is seated at the gaming machine but that the player has not satisfied at least one gameplay criterion, such as, for example, that the player has not established a minimum credit balance. Likewise, the active lighting configuration may be used to indicate that the player has established a minimum credit balance, but that the player has not satisfied at least one other gameplay criterion, such as, for example, that the player has not placed a minimum wager. Finally, a privileged lighting configuration may be used to indicate that the player is entitled to a comp (e.g., a comped item or service). In at least one embodiment, the privileged lighting configuration may be displayed when a player has established a minimum credit balance and placed a minimum wager.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming machine comprising:
- a cabinet;
- an illuminable notification mechanism that comprises a display and a bezel at least partially surrounding a perimeter of the display mounted on a surface of the cabinet, such that the notification mechanism is viewable by a casino operator proximate the cabinet, the notification mechanism configured to receive an input from the casino operator; and
- a game controller configured to execute instructions stored in a tangible, non-transitory, computer-readable storage medium, which, when executed by the game controller, cause the game controller to at least:
  - select, based upon an analysis of gameplay data of a player at the gaming machine, a first lighting configuration of the notification mechanism from a plurality of lighting configurations, the plurality of lighting configurations comprising i) a privileged lighting configuration indicating that a player of the electronic gaming machine is entitled to a complimentary item, ii) an inactive lighting configuration indicating that the player has not established or maintained a minimum credit balance on the electronic gaming machine, and iii) an active lighting configuration indicating the player has satisfied at least one gameplay criterion but has not reached a privileged status;
  - illuminate the notification mechanism in the selected first lighting configuration;
  - receive the input from the casino operator via the notification mechanism; and
  - illuminate, in response to the input, the notification mechanism in a second lighting configuration indicating, at least, that the player has received the complimentary item;
  - wherein the display is illuminable to provide the first notification and the bezel is separately and concurrently to the display illuminable to provide a third notification, the third notification indicating a predefined gameplay criterion has been met, the predefined gameplay criterion selected from a table of gameplay criterion.

2. The electronic gaming machine of claim 1, wherein the active lighting configuration indicates that the player has established a minimum credit balance on the electronic gaming machine but that the player has not placed a minimum wager on the electronic gaming machine.

3. The electronic gaming machine of claim 1, wherein the selected first lighting configuration is the privileged lighting configuration, and wherein the selected first lighting configuration further indicates that the player has established a minimum credit balance on the electronic gaming machine and that the player has placed a minimum wager on the electronic gaming machine.

4. The electronic gaming machine of claim 1, wherein the notification mechanism is a mechanical pushbutton, and wherein the notification mechanism includes at least one tri-color light emitting diode (LED) configured to display each lighting configuration of the plurality of lighting configurations.

5. The electronic gaming machine of claim 1, wherein the notification mechanism is a mechanical pushbutton mounted on a rear surface of the electronic gaming machine in a location that facilitates viewing of the notification mechanism by a casino operator, and wherein activation of the notification mechanism by the casino operator comprises depression of the mechanical pushbutton by the casino operator.

6. The electronic gaming machine of claim 1, wherein the instructions, when executed by the game controller, further cause the game controller to at least:
- monitor the gameplay data to select, based upon the analysis of gameplay data, the inactive lighting configuration of the notification mechanism from the plurality of lighting configurations;
- illuminate the notification mechanism in the inactive lighting configuration;
- monitor the gameplay data to select, based upon the analysis of gameplay data, the active lighting configuration of the notification mechanism from the plurality of lighting configurations,
- illuminate the notification mechanism in the active lighting configuration; and
- monitor the gameplay data to select, based upon the analysis of gameplay data, the privileged lighting configuration of the notification mechanism from the plurality of lighting configurations, the privileged lighting configuration further indicating that the player has established the minimum credit balance and that the player has placed the minimum wager.

7. The electronic gaming machine of claim 1, wherein the instructions, when executed by the game controller, further cause the game controller to at least:
- display a graphical user interface that enables a customizable selection by a casino operator of the plurality of lighting configurations; and receive, from the casino operator and via the graphical user interface, the customizable selection of the plurality of lighting configurations.

8. The electronic gaming machine of claim 1, wherein the table of gameplay criterion comprises a coin-in threshold, a coin-in for extra comp threshold, a player credit threshold, a coin-in rate threshold, a bet level threshold, a minimum currency denomination threshold, a reset threshold, a response time threshold, a credit balance threshold, a wager amount threshold, a comp rate threshold, an assistance request, a schedule occurrence, a win celebration and a max comps threshold.

9. An electronic gaming machine comprising:

an illuminable notification mechanism that comprises a display and a bezel at least partially surrounding a perimeter of the display located on a surface of a cabinet of the electronic gaming machine; and a game controller configured to execute instructions stored in a tangible, non-transitory, computer-readable storage medium, which, when executed by the game controller, cause the game controller to at least:

select, based upon an analysis of gameplay data of a player at the gaming machine, a first lighting configuration of the notification mechanism from a plurality of lighting configurations, the plurality of lighting configurations comprising i) a privileged lighting configuration indicating that a player of the electronic gaming machine is entitled to a complimentary item, ii) an inactive lighting configuration indicating that the player has not established or maintained a minimum credit balance on the electronic gaming machine, and iii) an active lighting configuration indicating the player has satisfied at least one gameplay criterion but has not reached a privileged status;

illuminate the notification mechanism in the selected first lighting configuration; and select, in response to activation of the notification mechanism by a casino operator, a second lighting configuration of the notification mechanism, the second lighting configuration indicating, at least, that the player has received the complimentary item;

wherein the display is illuminable to provide the first notification and the bezel is separately and concurrently to the display illuminable to provide a third notification, the third notification indicating a predefined gameplay criterion has been met, the predefined gameplay criterion selected from a table of gameplay criterion.

10. The electronic gaming machine of claim 9, wherein the active lighting configuration indicates that the player has established a minimum credit balance on the electronic gaming machine but that the player has not placed a minimum wager on the electronic gaming machine.

11. The electronic gaming machine of claim 9, wherein the selected first lighting configuration is the privileged lighting configuration and further indicates that the player has established a minimum credit balance on the electronic gaming machine and that the player has placed a minimum wager on the electronic gaming machine.

12. The electronic gaming machine of claim 9, wherein the notification mechanism is a mechanical pushbutton, and wherein the notification mechanism includes at least one tri-color light emitting diode (LED) configured to display each lighting configuration of the plurality of lighting configurations.

13. The electronic gaming machine of claim 9, wherein the notification mechanism is a mechanical pushbutton mounted on a rear surface of the electronic gaming machine in a location that facilitates viewing of the notification mechanism by a casino operator, and wherein activation of the notification mechanism by the casino operator comprises depression of the mechanical pushbutton by the casino operator.

14. The electronic gaming machine of claim 9, wherein the instructions, when executed by the game controller, further cause the game controller to at least:

monitor the gameplay data to select, based upon the analysis of gameplay data, the inactive lighting configuration of the notification mechanism from the plurality of lighting configurations;

illuminate the notification mechanism in the inactive lighting configuration;

monitor the gameplay data to select, based upon the analysis of gameplay data, the active lighting configuration of the notification mechanism from the plurality of lighting configurations, illuminate the notification mechanism in the active lighting configuration; and monitor the gameplay data to select, based upon the analysis of gameplay data, the privileged lighting configuration of the notification mechanism from the plurality of lighting configurations.

15. The electronic gaming machine of claim 9, wherein the instructions, when executed by the game controller, further cause the game controller to at least:

display a graphical user interface that enables a customizable selection by a casino operator of the plurality of lighting configurations; and receive, from the casino operator and via the graphical user interface, the customizable selection of the plurality of lighting configurations.

16. A method for selectively illuminating a notification mechanism that comprises a display and a bezel at least partially surrounding a perimeter of the display located on an electronic gaming machine, the electronic gaming machine comprising a display, a player input interface, a game controller, and a credit input mechanism including at least one of a card reader, a ticket reader, a bill validator, and a coin input mechanism, the method comprising:

selecting, by the game controller and based upon an analysis of gameplay data, a first lighting configuration of the notification mechanism from a plurality of lighting configurations, the plurality of lighting configurations comprising i) a privileged lighting configuration indicating that the player is entitled to a complimentary item, ii) an inactive lighting configuration indicating that the player has not established or maintained a minimum credit balance on the electronic gaming machine, and iii) an active lighting configuration indicating the player has satisfied at least one gameplay criterion but has not reached a privileged status;

illuminating, by the game controller, the notification mechanism in the selected first lighting configuration; and selecting, by the game controller and in response to activation of the notification mechanism by a casino operator, a second lighting configuration of the notification mechanism, the second lighting configuration indicating, at least, that the player has received the complimentary item;

wherein the display is illuminated to provide the first notification and the bezel is separately and concurrently to the display illuminated to provide a third notification, the third notification indicating a predefined gameplay criterion has been met, the predefined gameplay criterion selected from a table of gameplay criterion.

17. The method of claim 16, further comprising:

monitoring, by the game controller, the gameplay data to select, based upon the analysis of gameplay data, the inactive lighting configuration of the notification mechanism from the plurality of lighting configurations;

illuminating, by the game controller, the notification mechanism in the inactive lighting configuration;

monitoring, by the game controller, the gameplay data to select, based upon the analysis of gameplay data, the active lighting configuration of the notification mechanism from the plurality of lighting configurations, illuminating, by the game controller, the notification mechanism in the active lighting configuration; and monitoring, by the game controller, the gameplay data to select, based upon the analysis of gameplay data, the privileged lighting configuration of the notification mechanism from the plurality of lighting configurations, the privileged lighting configuration further indicating that the player has established the minimum credit balance and that the player has placed the minimum wager.

* * * * *